United States Patent [19]

Pistor et al.

[11] 4,326,243

[45] Apr. 20, 1982

[54] ELECTRIC LIGHT FIXTURE

[76] Inventors: Max Pistor, Kamp 3, 585 Schalksmuhle-Hulscheid; Ferdinand Pistor, Spielbergweg 11, 5974 Herscheid, both of Fed. Rep. of Germany

[21] Appl. No.: 152,402

[22] Filed: May 22, 1980

[30] Foreign Application Priority Data

May 26, 1979 [DE] Fed. Rep. of Germany ....... 2921425

[51] Int. Cl.[3] ............................................. B60Q 1/00

[52] U.S. Cl. ..................................... 362/368; 362/92; 362/126; 362/374; 362/306; 362/375; 362/455

[58] Field of Search ................ 362/92, 126, 226, 368, 362/374, 375, 306, 455

[56] References Cited

U.S. PATENT DOCUMENTS 3,313,930 4/1967 Smitley ................................ 362/92

*Primary Examiner*—Stephen J. Lechert, Jr.

*Attorney, Agent, or Firm*—Jacobs & Jacobs

[57] ABSTRACT

Electric light fixture for the illumination of ovens of electric ranges characterized by a pot-shaped metallic mount insertable in a cut-out in an oven wall and holding a lamp socket, lamp and cover glass which can be screwed on to the front side of the fixture into said mounting and the mounting having a stop rim and holding members corresponding to the edge of the cut-out on its rearward side for the lamp socket which is held in position by resilient tabs and the light fixture being particularly characterized in that it can be mounted in position by a single person.

9 Claims, 4 Drawing Figures

ELECTRIC LIGHT FIXTURE

The present invention relates to an electric light fixture for the illumination of ovens of electric ranges, which comprises a pot-shaped metallic mounting part insertable in a cut-out in a wall of the oven and which furthermore holds a lamp socket and lamp and a cover glass which can be screwed on the front side of the fixture into said mounting part, the mounting part having a stop rim and holding members which correspond with the edge of the cut-out and on its rear a central cut-out for the lamp socket which is held by resilient tabs forming a part of the mounting part, the mounting part being furthermore provided on its wall with an internal thread and having over its entire extent a smaller diameter than the stop rim.

This type of known light fixture is completely preassembled by the manufacturer and supplied together with an already inserted lamp to the consumer who then inserts the fixture into a corresponding cut-out in the receiving plate of the oven or the like from the front. Thereupon, the holding members, which are constructed as cut-out tabs and have also been pushed through the cut-out, are bent over from the rear in order to assure the fixture a firm seat in the cut-out.

This fixture, which has some advantages due to the formation of the mounting part and holding members as a single piece, is difficult and inconvenient to mount since generally two persons are required for this purpose, one of whom inserts the fixture from the front into the cut-out which lies way back in the oven while the other bends the holding members over. Furthermore, the mounting part is expensive to manufacture since it is not possible to produce it in a follow-on tool and at least the thread must be applied by a second tool and the grounding connector must be separately applied subsequently.

Based on the foregoing, the object of this invention is to create a light fixture of the above-described type which, while retaining the single-piece construction of mounting part and holding members, can be secured in position in the oven in a simple and easy manner by a single person and in connection with which the mounting part can be manufactured by a follow-on tool.

In order to achieve this purpose, the invention proposes that the mounting part have, as holding members, a plurality of radially outwardly protruding spring tabs cut out towards the stop rim and laterally and uniformly distributed over the periphery, said tabs having at least a slightly greater curvature than corresponds to the curvature of the mounting part; that the spring tabs have noses which protrude laterally outwards on their free end towards the stop rim; that the stop rim is bent down towards the bottom of the mounting part; that screw threads are impressed radially only between the spring tabs, and that a resiliently pretensionable sealing ring of metal can be clamped between the stop rim and the cover glass, an axially extending, radially outwardly protruding rib being furthermore formed on the mounting part and adapted to be inserted into a groove in the cut-out as assurance against twisting.

The manufacture of the mounting part of the light fixture is effected by a follow-on tool, the cutting and bending processes taking place in succession.

The short thread is also impressed in this tool.

The lamp socket is engaged by clamping into the mounting part, screwing in the lamp and screwing on the cover glass. The fixture is received pre-assembled in this manner by the consumer, who can insert it, solely with one person, into the cut-out in the oven, which is adapted to the circumference of the pot-shaped mounting part. For this purpose the cover glass is loosened, for which purpose a quarter of a revolution is sufficient, and pushed from the front into the cut-out in correct position. The spring tabs are initially pressed radially inward by the edges of the cut-out and then spring outwards under spring action after they have passed the edge of the cut-out.

In order to prevent excessive outward springing and thus a spreading apart upon the tightening of the cover glass, noses are cut on the edge of the spring tab. The spring tabs can therefore only move out until the noses rest against the edge of the cut-out. The cover glass is now tightened again, the turning-lock preventing the mounting part from also being twisted and the sealing ring assuring an initial spring tension for the connection. The fixture is thus completely installed.

In order that the sealing ring can be actuated without damaging the usually enamelled surface of the receiving plate, the sealing ring is provided with a radially extending surface, corresponding to a shoulder in the cover glass, which surface then passes into a slightly conical surface the free edge of which, resting against the clamping surface, is bent over in curved manner.

In order to achieve a particularly good fit to the somewhat uneven enamelled surface, it is proposed that the sealing ring consist of aluminum. Similarly, other relatively soft or deformable materials can also be used.

Since upon the cutting of the spring tabs and noses in ordinary manufacture a minimum free space of 2 mm is produced into which the edge of the receiving plate could possibly slide and thus interfere with the effective action of the noses, it is provided that the free cut between the stop rim and the noses of the spring tab is covered, at least approximately, by the curved collar of the stop rim.

A preferred embodiment provides three spring tabs and between them screw threads corresponding approximately to the tab cut-out in their longitudinal length. In order to avoid the subsequent attachment of a grounding connector it is provided that in the bottom of the mounting part three spring tabs and a grounding connector are cut out and bent approximately at right angles outwardly in order to form the socket passage, the grounding connector, shaped as a flat connector, being bent twice at its end.

Under certain circumstances it may be advantageous for the stop rim itself to be formed as a sealing ring.

Figure 2:
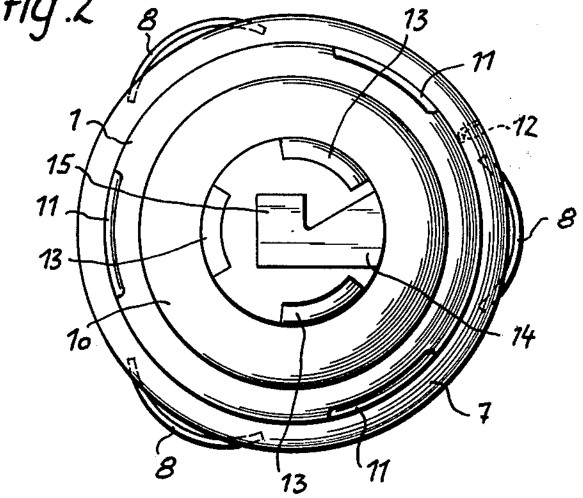
FIG. 2 shows the mounting part seen from above.
Figure 3:
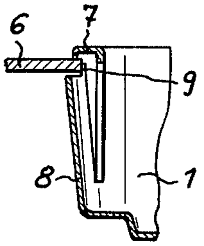
FIG. 3 shows a detail of FIG. 2, in longitudinal section.
Figure 4:
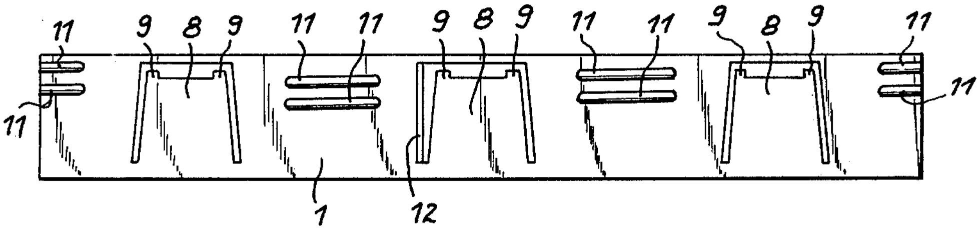
FIG. 4 shows a portion of the mounting part in a flattened view.

According to the present invention, the electric light fixture for ovens of electric ranges and the like comprises a pot-shaped mounting part 1 made of sheet metal, a lamp socket 2 of ceramics, a lamp 3, a cover glass 4, and a sealing ring 5. The fixture is inserted into a cut-out in a wall 6 of an oven in such a manner that the base part lies outside the oven and the fixture part extends inside the oven. The mounting part 1 has on its front a stop rim 7. Furthermore, there are uniformly distributed on the circumference of part 1 three spring tabs 8 which are cut free on their sides and towards the stop rim 7, which tabs are more greatly curved than corresponds to the curvature of the mounting part, as can clearly be noted from FIG. 2. The spring tabs 8 have noses 9 cut in them, which extend laterally outward towards the stop rim 7 at the free ends of the tabs. The stop rim 7 is bent downwardly towards the bottom 10 of the mounting part 1 so that the free cut between the noses 9 and the metal plate above them, amounting to about 2 mm, is covered.

Screw threads 11 in the form of short threads are impressed, at a distance form the spring tabs 8, in the region of the mounting part lying between the spring tabs 8.

On the mounting part 1, a rib 12 is cut out on the edge of a spring cut-out and bent radially outward, and inserted in a corresponding rib of the cut-out of the wall 6 as assurance against twisting.

Figure 1:
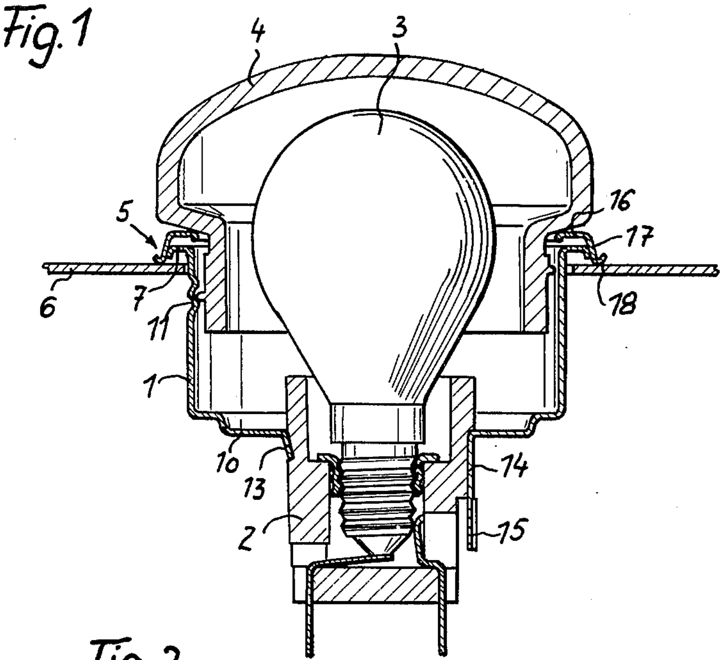
FIG. 1 shows a mounted light fixture in longitudinal section.

In the bottom 10 of the mounting part three further spring tabs 8 are cut out and bent over as fastening elements for the lamp socket 2. Another spring tab is formed as grounding connector 14, its terminal end part 15 being bent twice to form the flat connector (FIG. 1).

Between the cover glass 4 and the wall 6 the sealing ring 5 is clamped which consists of aluminum and furthermore has a radially extending surface 16 which corresponds to the shoulder of the cover glass and passes into a slightly conical surface 17 the free edge 18 of which rests against the wall 6 and is bent over in a curve.

We claim:

1. An electric fixture for the illumination of ovens of electric ranges, comprising a pot-shaped metallic mounting part insertable into a cut-out in a wall of the oven and which holds the lamp socket and its lamp assembled, and a cover glass which is screwed on the front side into the mounting part, the mounting part having on its front side a stop rim and holding members corresponding to the edge of the cut-out and at its rear a central cut-out for the lamp socket which is held by spring tabs which are formed from the mounting part, the mounting part being provided on its wall with an internal thread and having over its entire length a smaller diameter than the stop rim, the mounting part having a plurality of radially outwardly extending spring tabs uniformly distributed on the periphery and cut free laterally and towards the stop rim, which spring tabs are curved at least slightly more than corresponds to the curvature of the mounting part, and the spring tabs having noses which extend laterally outwards at their free end towards the stop rim, the stop rim being bent over towards the bottom of the mounting part and screw threads impressed radially between the spring tabs with a resiliently tensionable sealing ring of metal clamped between the stop rim and the cover glass, an axially extending radially outwardly protruding rib being formed on the mounting part and insertable in a groove in the cut-out as an anti-twisting device.

2. An electric fixture according to claim 1, wherein the sealing ring has a radially extending surface which corresponds to a shoulder of the cover glass and passes into a slightly conical surface whose free end, which rests against the clamping surface, is bent over into a curved shape.

3. An electric fixture according to claim 1, wherein the sealing ring consists of aluminum.

4. An electric fixture according to claim 1, wherein the open cut between the stop rim and the noses of the spring tabs is covered at least approximately by the bent-over collar of the stop rim.

5. An electric fixture according to claim 1, wherein three spring tabs are provided in the mounting part and between them there are screw threads corresponding approximately to the tab cut-out in their length.

6. An electric fixture according to claim 1, wherein the three spring tabs and a ground connector are cut from the bottom of the mounting part and bent over outwards approximately at right angles to form a passage for the socket, the ground connector being formed as a flat connector bent over twice at its end.

7. An electric fixture according to claim 1, wherein the stop rim is formed to act as the sealing ring.

8. An electric fixture according to claim 1, wherein the mounting part, prior to being formed into pot shape, is a substantially flat strip-like member of rectangular elongated nature provided with a plurality of spaced spring tabs cut out of the strip-like member and having noses thereon, there being a space between the spring tabs and the adjacent parts of the member, pairs of generally parallel screw threads impressed in said member between said spring tabs and similarly impressed partial screw thread portions at the ends of the member and aligned therewith, upon the shaping of the member to final form, to constitute an additional pair of parallel screw threads.

9. An electric fixture according to claim 8, wherein the successive pairs of impressed screw threads and screw thread portions are in inclined alignment form from one end of the member to the other end of the member.

* * * * *